Nov. 5, 1968 V. A. SCHADE 3,408,738
PIPE CUTTER HAVING A RAKER-TYPE CUTTER
Filed June 8, 1967 3 Sheets-Sheet 1
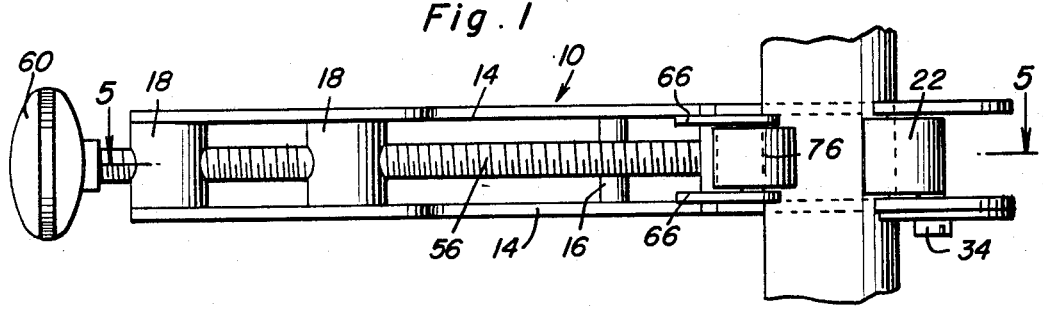
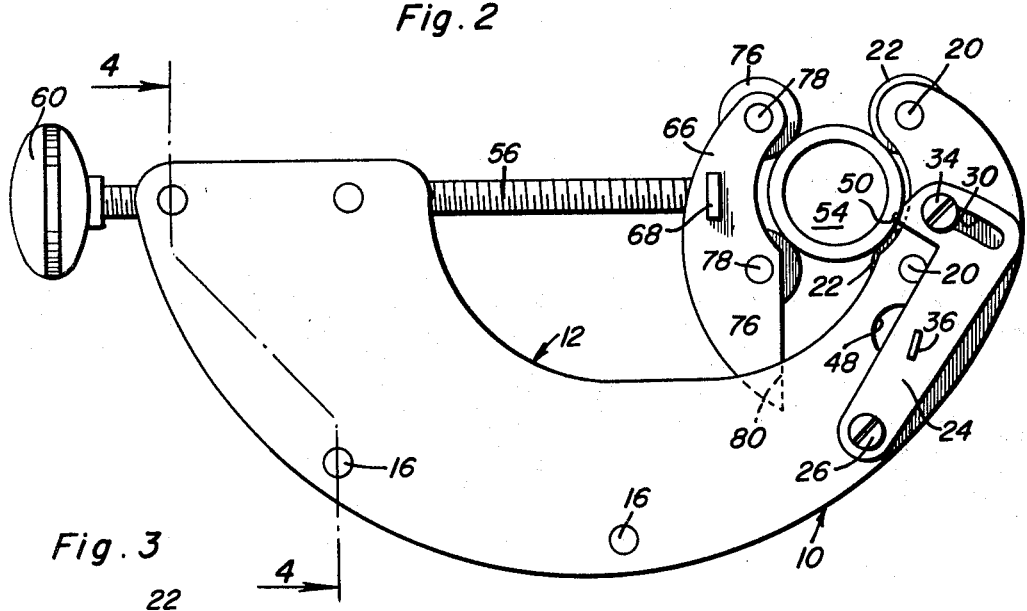
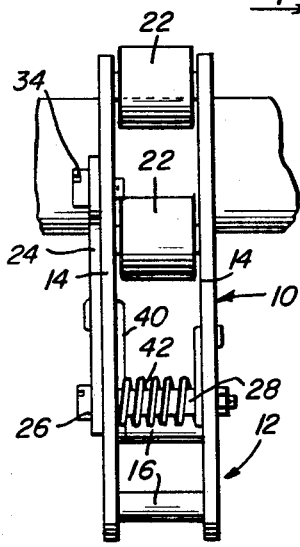
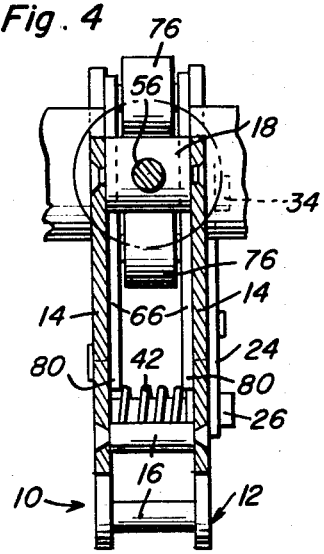
Virgil A. Schade
INVENTOR.

Virgil A. Schade
INVENTOR.

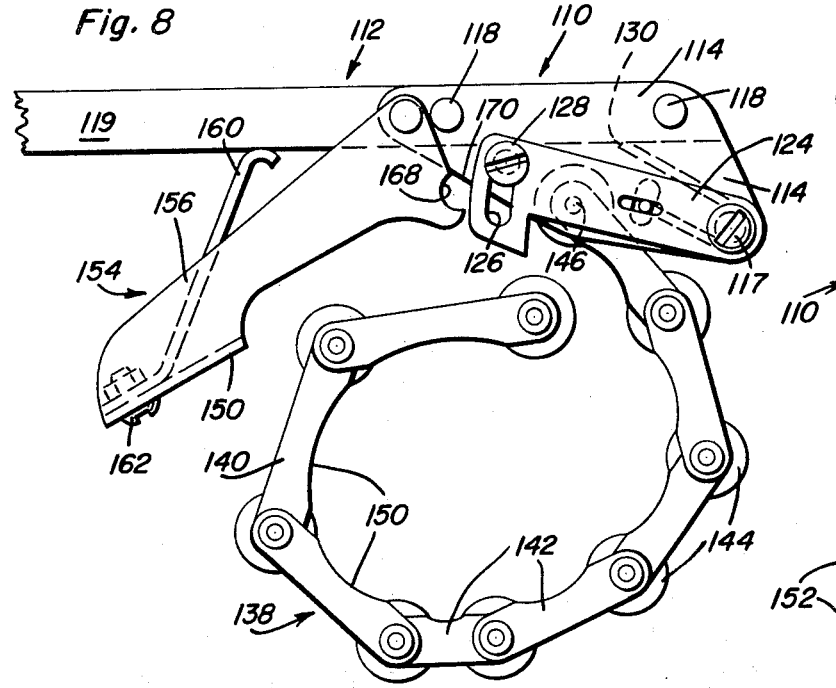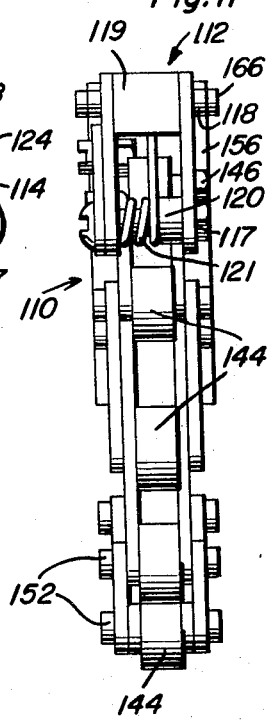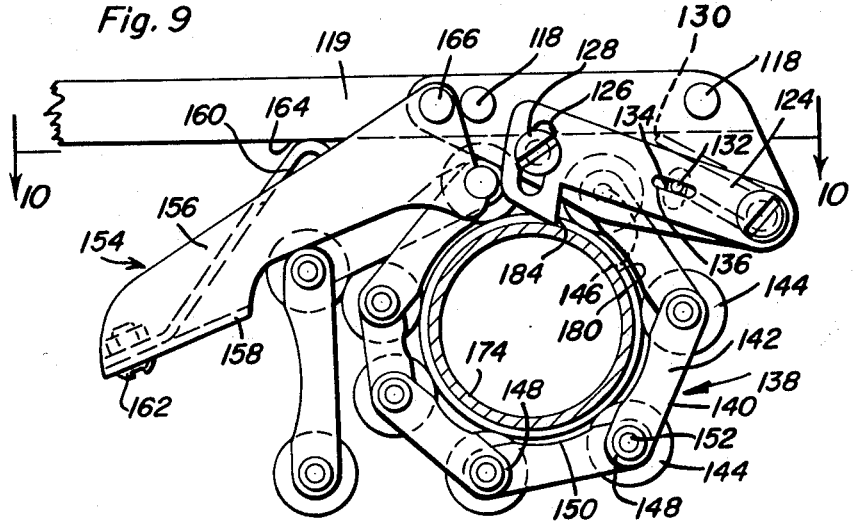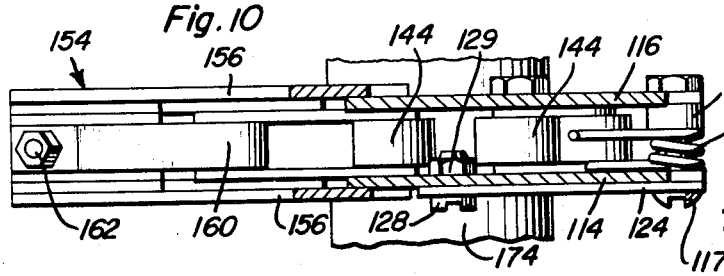

United States Patent Office 3,408,738
Patented Nov. 5, 1968

3,408,738
PIPE CUTTER HAVING A RAKER-TYPE CUTTER
Virgil A. Schade, Rockwell City, Iowa, assignor to
Eugene L. Turner, Dallas, Tex.
Continuation-in-part of application Ser. No. 591,168,
Nov. 1, 1966. This application June 8, 1967, Ser.
No. 657,446
6 Claims. (Cl. 30—95)

ABSTRACT OF THE DISCLOSURE

A support frame from which a plurality of spaced and generally parallel rollers are journalled for journalling the frame on a plastic pipe section or the like to be cut and including a spring urged raker-type cutting blade or element for cutting the pipe section as the frame is rotated about the pipe section, the rollers carried by the frame being readily adjustable in relative positions so as to adapt the frame for journalled support from various size pipe sections.

---

This application comprises a continuation-in-part application of my copending application U.S. Ser. No. 591,168, filed Nov. 1, 1966 for Pipe and Tube Cutter, now abandoned.

This invention relates to a novel and useful pipe and tube cutter and more specifically to a cutter designed primarily for cutting tubing constructed of plastic material or the like.

A major difference of the pipe cutter of the instant invention over more conventional pipe cutters presently in use comprises the use of a raking-type cutting element instead of aligned wedge-type cutting wheels designed to initially form and thereafter deepen a V-shaped circumferential cut extending about the pipe section which is to be cut. The cutter of the instant invention is provided with a raking-type of cutting element in that plastic piping and the like is not readily cut by the aforementioned more conventional types of cutters utilizing cutting wheels. When a piece of plastic pipe or tubing is cut with a conventional cutter, the wedging action of the cutting wheels on the tubing causes the outside diameter of the tubing immediately adjacent the cut to be slightly increased and thereby prevents plastic tubing cut in this manner to be readily inserted into a close fitting bore in which the tubing is to be secured by bonding materials.

Accordingly, the main object of this invention is to provide a pipe cutter constructed in a manner whereby it will be adapted to cut plastic tubing sections and the like in a manner maintaining the original outside diameter of the tubing being cut immediately adjacent the cut.

Another object of this invention, in accordance with the immediately preceding object, is to provide a tubing cutter including a raking-type cutting element or blade mounted on the cutter in a manner such that it will be yieldingly urged toward cutting engagement with the plastic tubing to be cut.

Another object of this invention, in accordance with the immediately preceding objects, is to provide a raking-type cutting element on the cutter mounted for adjustable positioning to compensate for different sizes of tubing sections being cut in a manner such that the angle of attack of the cutting edge on the tubing section to be cut will be maintained substantially constant even though different diameter tubing sections are to be cut.

Still another object of this invention is to provide a tubing or pipe section cutter including a support frame portion from which the raking-type cutting element or blade is pivotally supported and provided with generally parallel journalled rollers which may be readily adjusted in relative positions so as to adapt the frame to be journalled from pipe sections of various diameters.

Yet another object of this invention is to provide a tubing cutter in accordance with the preceding objects and including means by which the journalling rollers of the support frame of the cutter may have their relative positions quickly adjusted so as to enable the cutter to be quickly journalled on and removed from a pipe or tubing section.

A final object of this invention to be specifically enumerated herein is to provide a tubing cutter which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a first form of cutter shown operatively associated with a small diameter tubing section to be cut thereby;

FIGURE 2 is a side elevational view of the assemblage illustrated in FIGURE 1;

FIGURE 3 is an end elevational view of the assemblage illustrated in FIGURE 2 as seen from the right side thereof;

FIGURE 4 is a sectional view taken substantially upon the plane indicated by the section line 4—4 of FIGURE 2;

FIGURE 8 is a side elevational view of a second form of cutter constructed in accordance with the present invention and with portions of the elongated handle of the second cutter broken away;

FIGURE 9 is a side elevational view similar to FIGURE 8 but illustrating the cutter operatively supported from a pipe or tubing section being cut by the second form of cutter;

FIGURE 10 is a fragmentary sectional view taken substantially upon a plane indicated by section line 10—10 of FIGURE 9; and FIGURE 11 is an end elevational view of the assemblage illustrated in FIGURE 8 as seen from the right side thereof.

Figure 5:
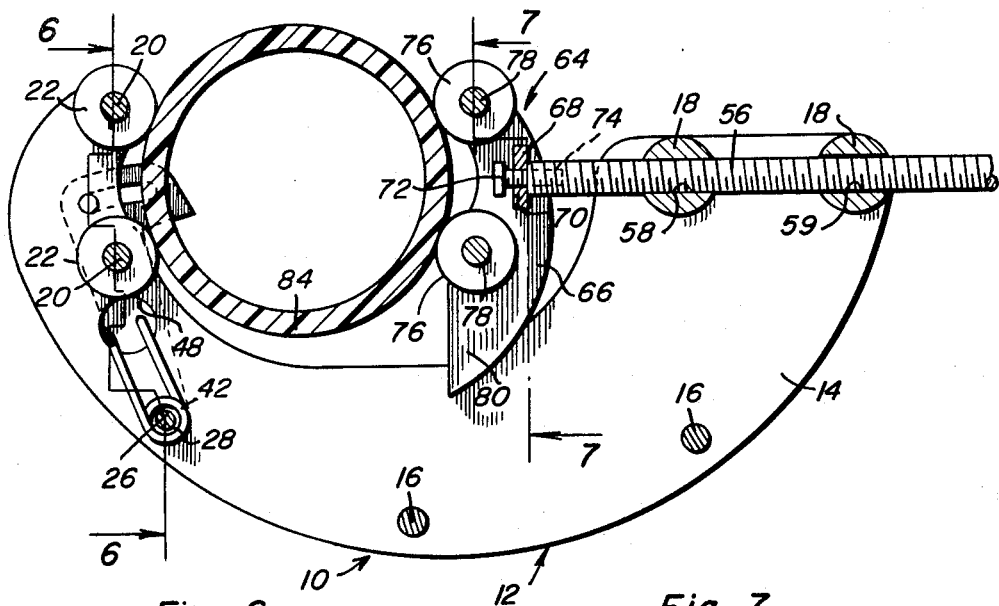
FIGURE 5 is a fragmentary longitudinal sectional view taken substantially upon the plane indicated by the section line 5—5 of FIGURE 1 but illustrating the cutter operatively associated with a large diameter tubing section.
Figure 6:
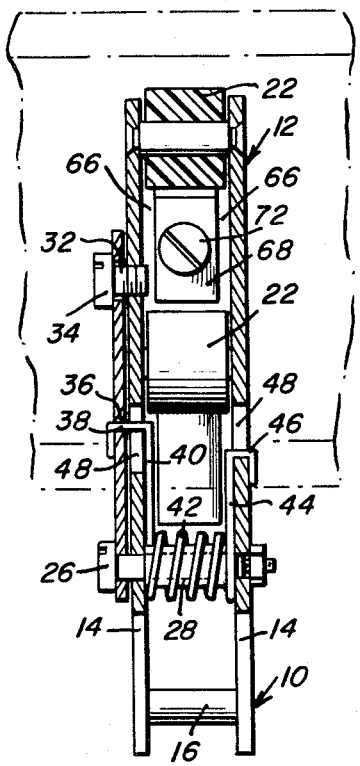
FIGURE 6 is a transverse sectional view taken substantially upon the plane indicated by the section line 6—6 of FIGURE 5.
Figure 7:
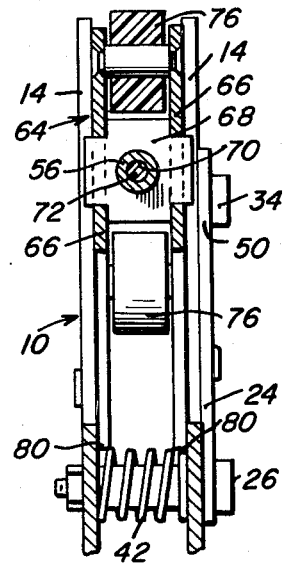
FIGURE 7 is a transverse sectional view taken substantially upon the plane indicated by the section line 7—7 of FIGURE 5.

Referring now more specifically to the drawings, the numeral 10 generally designates a first form of tubing cutter. The cutter 10 includes a support frame generally referred to by the reference numeral 12 and consisting of a pair of opposite side support and guide plates 14 interconnected in spaced parallelism by means of spacing fasteners 16, spacing sleeve members 18, and spacing axle members 20.

A pair of rollers 22 are journaled from the axle members 20 and a raking-type cutting member or element 24 is pivotally secured to the frame 12 by means of a removable fastener 26 having a spacing sleeve 28 disposed thereon between the plates or side members 14. The free end of the cutting member is provided with an arcuate slot 30 receiving therethrough the shank portion 32 of a fastener 34 threadedly engaged with the corresponding side member 14. In addition, the cutting or cutter member 24 is apertured as at 36 and receives therethrough the terminal end portion 38 of one arm 40 of a coil spring 42 disposed about the spacing sleeve 28 and including a second arm member 44 on its other end having a terminal end portion 46 passed through an opening 48 formed in the adjacent side member 14, the terminal end portion 38 also extending through an opening 48 formed in the other side member 14.

The cutting member 24 includes a cutting edge 50 that is movable generally radially of the center of an area 54 disposed outwardly of a plane containing the axes of rotation of the rollers 22 in the direction toward the members 18, see FIGURES 2 and 5.

An operating screw support and thrust shaft 56 is threadedly secured through an internally threaded bore 58 formed through one of the members 18, slidingly received through a smooth bore 59 formed through the other member 18 and provided with a knob-like handle 60 on its end remote from the rollers 22.

The end of the screw shaft 56 adjacent the rollers 22 has a crosshead assembly generally referred to by the reference numeral 64 mounted thereon including a pair of opposite side plates 66 interconnected by means of a web portion 68 apertured as at 70 so as to rotatably receive a threaded fastener 72 extending therethrough and threadedly engaged in a threaded blind bore 74 formed in the adjacent end of the screw shaft 56. A pair of movable rollers 76 are journaled on spacing axle members 78 secured between the plates 66 and each of the latter includes an end portion 80 whose outer surface is slidingly and guidingly engaged with the inner surface of the corresponding side member or plate 14 and thereby maintains the crosshead 64 against rotation relative to the frame 12. Therefore, the axes of rotation of the rollers 22 and 76 will be maintained substantially parallel at all times.

Although the rollers 76 could be replaced by a single roller, inasmuch as the cutter 10 is adapted to cut plastic piping and conduits which are not as rigid as and are considerably more deformable than metallic pipe sections, a pair of rollers 76 are utilized in order to more evenly distribute the clamping pressure of the screw shaft 56 on the pipe section 84. Further, the cutting edge 50 is movable through a slightly arcuate path which extends generally radially of the center of the area 54 and between the axes of rotation of the rollers 76.

The path of movement of the cutting edge 50 is more closely adjacent the lower roller 22 of FIGURE 2 than the upper roller 22. The angle of inclination of the cutting edge 50 relative to a radius of the pipe section being cut passing through the point of contact of the edge 50 with the pipe section, the positioning of the path of movement of the edge 50 relative to the rollers 22 and the spring urged mounting of the cutting member 24 combine to enable the rotation of the pipe section being cut to apply a force on the cutting member opposing the spring 42 whereby increased forces applied to the cutting member 24 by a slight increase in the depth of cut made by the cutting member 24 will increase the force opposing the spring 42 and immediately reduce the depth of cut. Therefore, the depth of cut made by the cutting member is automatically adjusted so as to be uniform.

The cutting member 24 is obviously a raker-type of cutting member and therefore has no tendency to self-feed itself into a pipe section being cut and the resultant cut in a pipe section is free of any slight diametric enlargements immediately adjacent and on opposite sides of the cut being made.

With attention now invited more specifically to FIGURES 8–11 of the drawings there may be seen a second form of cutter generally referred to by the reference numeral 110 including a frame referred to in general by the reference numeral 112 consisting of a pair of opposite sides plates 114 and 116 interconnected in spaced parallelism by means of fasteners 117 and 118. One end portion of an elongated handle 119 is disposed between corresponding edge portions of the plates 114 and 116 and the fasteners 118 extend through these marginal edge portions of the plates 114 and 116 as well as the handle 119 to clampingly engage the latter between the plates 114 and 116.

The marginal edge portions of the plates 114 and 116 secured together by the fastener 117 are spaced apart by means of a spacing sleeve 120 and a coiled torsion spring 121 disposed about the fastener 118 between the plates 114 and 116.

In addition, an elongated raking-type cutting member or tooth 124 having a cutting edge 184 has one end thereof guidingly pivotally supported on the fastener 117 between the head of the latter and the plate 114. The free end of the cutting blade or member 124 has a slot 126 formed therein and a shank-type fastener 128 is secured through the slot 126 and the plate 114 by means of a self-locking nut 129. One end of the torsion spring 121 abuts the handle 119 as at 130 and the other end of the torsion spring 121 includes a laterally directed end portion 132 which is slidably received through an arcuate slot 134 formed in the plate 114 as well as a longitudinal slot 136 formed in the cutting member 124.

An elongated link chain assembly is generally designated by the reference numeral 138 and includes pivotally interconnected individual links 140 each comprising a pair of opposite side link straps 142 whose ends are overlapped with and pivotally secured to the corresponding link straps of the adjacent link 140. In addition, a pipe section gripping roller 144 is journalled between the overlapped ends of the links 40. One end of the link chain assembly 138 comprises a free end thereof and the other end of the link chain assembly 138 is secured between the plates 114 and 116 by means of a suitable pivot fastener 146.

The opposite ends of the link straps 142 are rounded as at 148 and each link stap 142 includes an outwardly concaved arcuate edge portion 150 intermediate its opposite ends. Further, the overlapped ends of the links 140 are pivotally interconnected by means of pivot fasteners 152 extending therebetween and upon which the corresponding roller 144 is journalled.

A lever referred to in general by the reference numeral 154 is provided and includes a pair of opposite side flange portions 156 interconnected at one pair of corresponding ends by means of a bight portion 158 extending therebetween. One end of a leaf spring 160 is secured to the bight portion 158 by means of a fastener 162 and the free end of the leaf spring 160 abuts against the handle 119 as at 164. The end edge portions of the flange portions 156 remote from the bight portion 158 are pivotally secured to the handle 119 by means of a pivot fastener 166 extending through the flange portions 156, the plates 114 and 116 and the handle 119. The flange portions 156 include aligned semi-circular recesses 168 which oppose edge portions 170 of the plates 114 and 116.

In operation, a section of plastic tubing or the like such as that designated by the reference numeral 174 is engaged by the cutter 110 in the manner illustrated in FIGURE 9 of the drawings and the link chain assembly 138 is thereafter snugly looped about the tubing section 174 with the opposite end portions of one of the pivot fasteners 152 received in the semi-cylindrical notches or recesses 168 after the free end portion of the lever 154 has been urged toward the handle 119. Then, the lever 154 may be released whereby the tension of the spring 160 will urge the free end of the lever 154 to pivot to the position thereof illustrated in FIGURE 9 of the drawings tightening the link chain assembly 138 about the tubing section 174 with the rollers 144 tightly rollingly engaged with the outer surface portions of the tubing section in an area thereof spaced laterally of the plane through which the cutting member 124 is swingable. In this manner, the frame 112 is journalled from the tubing section 174 and it may be subsequently rotated relative to the tubing section 174 in a clockwise direction as viewed in FIGURE 9 of the drawings whereupon the spring urged cutter member 124 will cut and continue to deepen a circumferential cut 180 about the tubing section 174 until the latter is fully cut.

It is believed that it may be readily appreciated that the link chain assembly 138 enables the cutter 110 to be utilized for cutting pipe sections of various diameters. Further, although the links 140 are illustrated as being of several different lengths, they may be of the same length although it has been found that by constructing the links 40 of different lengths the cutter 110 is more readily adapted to be operatively journalled from conventional tubing sizes.

When the lever 154 is released, the pivot fastener 152 seated in the recesses or notches 168 is spring urged toward the fastener 148 and therefore the link chain assembly 138 is tightly drawn about the tubing section 174. Further, inasmuch as the rollers 144 are of appreciable axial length the journalling action of the frame 112 on the tubing section 174 is quite precise and therefore the circumferential cut 180 provides a substantially square end cut through the tubing section 174.

Each of the cutters 10 and 110 provides means for precisely journalling a frame from a tubing section to be cut and includes a swingable spring urged cutting blade or member supported from its frame. By this construction and by the mounting of the cutting edge 50 of the cutter 10 and the cutting edge 184 of the cutting member 124 for swinging movement generally radially of the tubing sections to be cut as well as the rake of the cutting edges 50 and 184, the cutters 10 and 110 are operable to smoothly cut a section of plastic pipe or tubing without excessive feeding of the cutting edges 50 and 184 into the tubing section being cut.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plastic tube and pipe cutter including a support frame, a plurality of spaced roller means supported from said frame for rotation about generally parallel axes and adapted to receive a cylindrical member therebetween with the outer peripheral surface portions of said roller means disposed in tight rolling engagement with the outer surfaces of said cylindrical member, an elongated raker-type cutter tooth pivotally supported at one end from said frame for rotation about an axis generally paralleling said rollers, a cutting edge on the other end of said tooth adapted to cut said cylindrical member, said cutting edge being mounted for movement generally radially of the center of said area for engagement with said cylindrical member, means yieldingly urging said cutter tooth in a direction to shift said cutting edge inwardly toward said center of said area, said frame including a pair of laterally spaced apart opposite side plates, said roller means being disposed between planes containing said opposite side plates, and said raker type cutter tooth being pivotally supported from one of said side plates in guiding engagement therewith and disposed on the side thereof remote from the other of said side plates.

2. The combination of claim 1 wherein two of said roller means are journaled for rotation about fixed axes, said support frame including elongated guide means disposed in a plane generally paralleling a line normal to the plane in which said fixed axes are disposed, a screw support and thrust shaft threadedly engaged with said frame for longitudinal shifting generally along said line, a head carried on the end of said shaft adjacent said fixed axes and rotatable relative to said shaft about an axis coinciding with the axis of rotation of said shaft, the first-mentioned roller means including movable roller means journaled from said head, said head including follower means operatively associated with said guide means to prevent rotation of said head relative to said frame.

3. The combination of claim 2 wherein said movable roller means includes a pair of roller whose axes of rotation lie in a plane generally paralleling the plane in which said fixed axes lie and on opposite sides of and are generally equally spaced from a plane generally paralleling and equally spaced from said fixed rollers and disposed normal to the plane in which said fixed rollers lie.

4. The combination of claim 1 including an elongated link chain assembly consisting of a plurality of end overlapped and pivotally connected links, said roller means comprising a plurality of rollers extending transversely of and being journalled between said overlapped ends and also from the opposite ends of said link chain assembly, one end of said assembly being pivotally supported from said frame for rotation about an axis coinciding with the axis of rotation of the adjacent roller, said frame including means operative to engage a selected link end, tighten said chain assembly about an associated cylindrical member to be cut and stationarily position the axis of rotation of the roller at said selected link end.

5. The combination of claim 4 wherein the last mentioned means includes an elongated lever pivotally supported from said frame, spring urged to a first limit position of pivotal movement and including means operative to seatingly engage portions of said selected link end and urge the latter toward the other end of said link assembly upon movement of said lever toward said first limit position.

6. The combination of claim 1 wherein two of said roller means are journaled for rotation about fixed axes, said support frame including elongated guide means disposed in a plane generally paralleling a line normal to the plane in which said fixed axes are disposed, a screw support and thrust shaft threadedly engaged with said frame for longitudinal shifting generally along said line, a head carried on the end of said shaft adjacent said fixed axes and rotatable relative to said shaft about an axis coinciding with the axis of rotation of said shaft, the first-mentioned roller means including movable roller means journalled from said head, said head including follower means operatively associated with said guide means to prevent rotation of said head relative to said frame, said movable roller means including a pair of rollers whose axes of rotation lie in a plane generally paralleling the plane in which said fixed axes lie and on opposite sides of and are generally equally spaced from a plane generally paralleling and equally spaced from said fixed rollers and disposed normal to the plane in which said fixed rollers lie, said head including a pair of opposite side plates, said movable roller means being journalled between said plates, a web connected between said plates, said web being journalled on the end of said shaft adjacent said fixed axes against axial displacement relative to said shaft, the plates of said head including extensions comprising said follower means and overlapping and slidingly engageable with the opposite side plates of said frame, said opposite side plates of said frame comprising said guide means.

References Cited

UNITED STATES PATENTS

| | | | |
|---|---|---|---|
| 136,004 | 2/1873 | Pennock et al. | 30—95 X |
| 1,215,120 | 2/1917 | Cramer | 30—94 |
| 1,322,007 | 11/1919 | Golding | 30—94 |
| 2,281,366 | 4/1942 | Metcalf | 30—100 X |
| 2,990,612 | 7/1961 | Gill | 30—100 |
| 3,048,920 | 8/1962 | Wheeler | 30—100 X |
| 3,243,878 | 4/1966 | Bjalme et al. | 30—95 |

FOREIGN PATENTS

| | | |
|---|---|---|
| 79,966 | 3/1895 | Germany. |

MYRON C. KRUSE, *Primary Examiner.*